United States Patent
Kupka

(10) Patent No.: US 10,220,846 B2
(45) Date of Patent: Mar. 5, 2019

(54) METHOD AND DEVICE FOR OPERATING A VEHICLE

(71) Applicant: Robert Bosch GmbH, Stuttgart (DE)

(72) Inventor: Bjoern Kupka, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 100 days.

(21) Appl. No.: 15/321,322

(22) PCT Filed: May 21, 2015

(86) PCT No.: PCT/EP2015/061205
§ 371 (c)(1),
(2) Date: Dec. 22, 2016

(87) PCT Pub. No.: WO2015/197270
PCT Pub. Date: Dec. 30, 2015

(65) Prior Publication Data
US 2017/0158192 A1    Jun. 8, 2017

(30) Foreign Application Priority Data
Jun. 24, 2014 (DE) .................. 10 2014 212 047

(51) Int. Cl.
*B60W 30/095* (2012.01)
*B60W 50/14* (2012.01)
(Continued)

(52) U.S. Cl.
CPC .......... *B60W 30/0956* (2013.01); *B60T 7/22* (2013.01); *B60W 10/184* (2013.01);
(Continued)

(58) Field of Classification Search
None
See application file for complete search history.

(56) References Cited

U.S. PATENT DOCUMENTS

2003/0139883 A1* 7/2003 Takafuji ............. B60R 21/0132
                                                          701/301
2013/0218416 A1* 8/2013 Shirato ................... B60T 7/22
                                                          701/42

FOREIGN PATENT DOCUMENTS

DE    102006010275 A1    12/2006
DE    102006044179 A1    9/2007
(Continued)

OTHER PUBLICATIONS

International Search Report for PCT/EP2015/061205, dated Aug. 27, 2015.

*Primary Examiner* — Kimberly S Berona
*Assistant Examiner* — Kyung J Kim
(74) *Attorney, Agent, or Firm* — Norton Rose Fulbright US LLP; Gerard Messina

(57) ABSTRACT

A method for operating a vehicle, including the following: detection of a vehicle environment; detection of a steering angle for a vehicle wheel that is defined by a steering device; ascertainment of a collision probability for the vehicle based on the detected vehicle environment and the detected steering angle in the case of an unchanged steering angle; correction of the steering angle if the ascertained collision probability is greater than or equal to a predetermined collision probability threshold in order to prevent a collision. Also described is a device for operating a vehicle and a computer program.

7 Claims, 2 Drawing Sheets

(51) Int. Cl.
  *B60W 10/184* (2012.01)
  *B60W 10/20* (2006.01)
  *G08G 1/16* (2006.01)
  *G08G 1/0962* (2006.01)
  *B62D 15/02* (2006.01)
  *B60W 30/09* (2012.01)
  *B60T 7/22* (2006.01)
  *B60Q 1/52* (2006.01)
  *B60W 50/00* (2006.01)

(52) U.S. Cl.
  CPC ............ *B60W 10/20* (2013.01); *B60W 30/09* (2013.01); *B60W 30/095* (2013.01); *B60W 50/14* (2013.01); *B62D 15/025* (2013.01); *B62D 15/0265* (2013.01); *G08G 1/09626* (2013.01); *G08G 1/165* (2013.01); *G08G 1/166* (2013.01); *G08G 1/167* (2013.01); *B60Q 1/525* (2013.01); *B60T 2201/022* (2013.01); *B60W 2050/009* (2013.01); *B60W 2050/143* (2013.01); *B60W 2520/10* (2013.01); *B60W 2540/18* (2013.01); *B60W 2710/207* (2013.01)

(56) References Cited

FOREIGN PATENT DOCUMENTS

| | | |
|---|---|---|
| DE | 102011080789 A1 | 2/2012 |
| DE | 102012108563 A1 | 3/2014 |
| DE | 102012215952 A1 | 3/2014 |
| JP | 2005310011 A | 11/2005 |
| JP | 2008247327 A | 10/2008 |
| JP | 2012192776 A | 10/2012 |
| JP | 2013079068 A | 5/2013 |
| WO | 2006070865 A1 | 7/2006 |

* cited by examiner

METHOD AND DEVICE FOR OPERATING A VEHICLE

FIELD OF THE INVENTION

The present invention relates to a method for operating a vehicle. The present invention further relates to a device for operating a vehicle and a computer program.

BACKGROUND INFORMATION

Lane-keeping assist systems for a vehicle are known per se. They are generally able to keep a vehicle in a prescribed lane. This is accomplished in particular by an intervention in a steering system of the vehicle.

SUMMARY OF THE INVENTION

The object of the present invention is to provide a method for operating a vehicle.

The object of the present invention is also to indicate a device for operating a vehicle.

The object of the present invention is furthermore to provide a computer program.

These objectives are achieved by the respective subject matter of the independent claims. Advantageous embodiments of the present invention are the subject matter of the respective dependent claims.

According to one aspect, a method for operating a vehicle is provided, including the following steps:

Detection of a vehicle environment,

Detection of a steering angle for a vehicle wheel specified by a steering device, Ascertainment of a collision probability for the vehicle based on the detected vehicle environment and the detected steering angle in the case of an unchanged steering angle, Correction of the steering angle if the ascertained collision probability is greater than or equal to a predetermined collision probability threshold in order to prevent a collision.

According to a further aspect, a device for operating a vehicle is provided, including:

a detection device for the detection of a vehicle environment, a further detection device for the detection of a vehicle wheel steering angle specified by a steering device, a processing unit for ascertaining a collision probability for the vehicle based on the detected vehicle environment and the detected steering angle in the case of an unchanged steering angle, and a control unit for controlling the steering angle to correct the steering angle if the ascertained collision probability is greater than or equal to a predetermined collision probability threshold in order to prevent a collision.

Provided according to a further aspect is a computer program that includes program code for the implementation of the method for operating a vehicle if the computer program is executed on a computer.

The present invention therefore includes in particular the idea of automatically correcting the steering angle specified by the steering device if the steering angle specified by the steering device was selected by the driver of the vehicle to be too large or too small and a collision, for example, a rear-end collision, would result without intervention. According to the present invention, it is provided here that the steering angle is corrected in such a case. This is based on a comparison between the ascertained collision probability and the predetermined collision probability threshold. This achieves in particular the technical advantage of being able to avoid a collision or at least being able to reduce an accident severity in the event of a collision.

According to one specific embodiment, it is provided that the steering device includes a steering wheel. This means that the steering angle specified by the steering wheel is detected.

According to one specific embodiment, the steering angle corresponds to the steering angle of two vehicle wheels that are joined, for example, via a common axle. This means that the steering angle of two vehicle wheels is detected.

According to a further specific embodiment, it is provided that the steering angle is corrected only within a turning direction specified by the steering device. As a result, in particular the technical advantage is achieved that abrupt vehicle directional changes owing to a change of the turning direction are prevented. This could result, for example, in swerving of the vehicle. Based on this specific embodiment, the technical advantage is therefore achieved, for example, that swerving of the vehicle during an automatic correction is able to be prevented or at least reduced.

A further specific embodiment provides for ascertaining whether the specified turning direction of the steering device also has to be changed in addition to (or in spite of) a correction of the steering angle in order to prevent a collision and a warning being output to change the turning direction if such is the case. This yields in particular the technical advantage that the driver is able to recognize that he must change the turning direction of the steering device, in particular of the steering wheel, in order to prevent a collision. The warning therefore includes a prompt to change the turning direction.

A turning direction as defined by the present invention is left or right relative to a direction of travel of the vehicle.

In a further specific embodiment, it is provided that an instantaneous target corridor of the vehicle is ascertained based on the detected steering angle, it being ascertained based on the detected vehicle environment whether an object is located in the instantaneous target corridor and, if so, a warning being output. This yields in particular the technical advantage that the driver of the vehicle obtains knowledge of the fact that an object is located within the instantaneous target corridor. He is thus able to adapt or correct his driving accordingly. As a result, a collision with the object is able to be prevented in an advantageous manner.

In a further specific embodiment, it is provided that a collision time is calculated, a prompt to carry out emergency braking being transmitted to a brake system of the vehicle in the event of a correction of the steering angle if the ascertained collision time is less than or equal to a predefined collision time threshold. As a result, in particular the technical advantage is achieved that even in the event of a collision the accident severity is able to be reduced. This is because an impact speed or collision speed is reduced because of initiated emergency braking, so that the vehicle strikes the object at a reduced speed.

An object as defined by the present invention may be, for example, another vehicle, a person or an animal or a stationary infrastructure.

According to a further specific embodiment, it is provided that an instantaneous vehicle speed is detected and a lane-keeping assist system of the vehicle is deactivated in the event of a correction of the steering angle if the instantaneous vehicle speed is greater than or equal to a predetermined vehicle speed threshold.

In a further specific embodiment, it is provided that, in the event of a correction of the steering angle, a hazard warning system of the vehicle is activated to warn road users. This applies in particular only if the instantaneous vehicle speed is greater than or equal to a predefined vehicle speed threshold. For example, this threshold is 20 km/h. This achieves in particular the technical advantage that other road users are warned that the vehicle represents a potential collision hazard. The other road users are thus advantageously able to adapt their behavior accordingly. Traffic safety is advantageously increased as a result.

According to one specific embodiment, it is provided that the detection device includes one or a plurality of driving environment sensors. The plurality of driving environment sensors is configured, for example, identically or, which may be, differently. A driving environment sensor is, for example, a radar sensor, an ultrasound sensor, a LiDAR sensor or a video sensor. The driving environment sensor is configured, for example, as a distance sensor or as a parking sensor. For example, the video sensor is a video sensor of a camera system. In particular, the radar sensor is the radar sensor of a radar system. The radar system is configured in particular to carry out a distance determination from objects in the vehicle environment.

According to one specific embodiment, the further detection device includes a steering wheel sensor for detecting a steering angle of the vehicle steering wheel.

According to one specific embodiment, the brake system of the vehicle includes an antilock braking system (ABS) and/or an anti-slip system.

Specific embodiments of the device arise accordingly from specific embodiments of the method and vice-versa. Embodiments, features and advantages regarding the device apply analogously for the method and vice-versa.

According to one specific embodiment, the device is configured to carry out the method.

According to one specific embodiment, the computer program is executed on the control device.

The formulation "greater than or equal to" includes in particular the "exclusively greater than" case. The formulation "less than or equal to" includes in particular the "exclusively less than" case.

The present invention is explained in greater detail in the following with reference to the exemplary embodiments.

DETAILED DESCRIPTION

Figure 1:
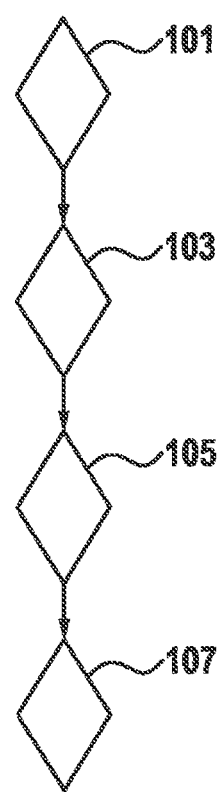
FIG. 1 shows a flowchart of a method for operating a vehicle.

FIG. 1 shows a flowchart of a method for operating a vehicle.

According to a step 101, a vehicle environment is detected. This is accomplished, for example, via a driving environment sensor system of the vehicle. The driving environment sensor system includes one or a plurality of driving environment sensors.

In a step 103, a steering angle specified by a steering device for a vehicle wheel, for example, for two vehicle wheels, is detected. This is accomplished, for example, via a steering wheel sensor. This means that the steering angle of the steering wheel is detected.

In a step 105, a collision probability is ascertained for the vehicle based on the detected vehicle environment and the detected steering angle in the case of an unchanged steering angle. This is accomplished, for example, by a processing device. The processing device ascertains, for example, a vehicle trajectory that the vehicle would travel if the steering angle remained unchanged. Based on this vehicle trajectory and the detected vehicle environment, for example, the collision probability is ascertained.

In a step 107, the steering angle is corrected if the calculated collision probability is greater than or equal to a predetermined collision probability threshold in order to prevent a collision. This is accomplished, for example, via a control device. That is to say, the correction of the steering angle includes a control of the steering angle.

Figure 2:
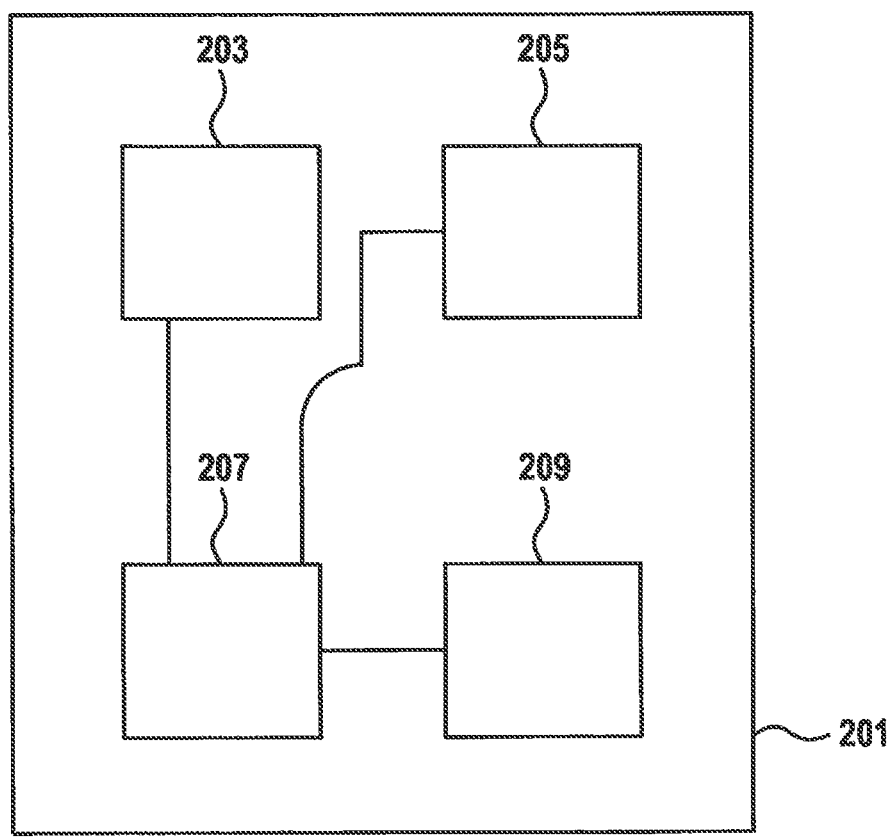
FIG. 2 shows a device for operating a vehicle.

FIG. 2 shows a device 201 for operating a vehicle (not shown).

Device 201 includes a detection device 203 for detecting a vehicle environment. The detection device includes, for example, one or a plurality of driving environment sensors.

Device 201 furthermore includes another detection device 205 for detecting a steering angle specified by a steering device for a vehicle wheel, for example, for two vehicle wheels, in particular for a plurality of vehicle wheels. Additional detection device 205 includes, for example, a steering wheel sensor for detecting a steering wheel angle. The steering wheel angle specifies the steering angle.

Device 201 further includes a processing unit 207 for the calculation of a collision probability for the vehicle based on the detected vehicle environment and the detected steering angle in the case of an unchanged steering angle.

Device 201 further includes a control unit 209 for controlling the steering angle to correct the steering angle if the ascertained collision probability is greater than or equal to a predetermined collision probability threshold in order to prevent a collision.

To control the steering angle, the control device is operatively connected, for example, to one or a plurality of actuators of the vehicle.

The present invention therefore includes in particular the idea of detecting a vehicle environment via one or a plurality of distance sensors and/or via one or a plurality of radar sensors and/or via a camera system and automatically correcting a steering angle of vehicle wheels, if the steering angle specified by the steering wheel was selected by the driver of the vehicle to be too large or too small and a collision, for example, a rear-end collision, would result without intervention. For example, only the turning direction (to the left or right with respect to the vehicle's direction of travel) is specified by the steering wheel. The correct steering angle is automatically calculated in particular via the processing device.

For example, it is provided according to one specific embodiment that a warning is output to the driver if, even with a correction (or in spite of a correction) of the steering angle, a collision, for example, a rear-end collision, would result and, therefore, the turning direction must be changed.

For example, it is provided according to one specific embodiment to ascertain whether something (for example, another vehicle, one or a plurality of persons, an animal or a plurality of animals or a stationary infrastructure) is located and/or moving within the direct target corridor of the vehicle. This is signaled in particular to the driver.

In one specific embodiment (not depicted), it is provided that prior to a collision, in particular prior to a rear-end collision, it is signaled to an antilock braking system that emergency braking must be initiated. The antilock braking system initiates the emergency braking in response to this signal.

According to a further specific embodiment (not depicted), it is provided that, starting at a predetermined vehicle speed, for example, greater than 20 km/h, a lane-keeping assist system of the vehicle is deactivated.

In yet a further specific embodiment (not depicted), it is provided that, in the event of a correction of the steering angle, a hazard warning system of the vehicle is activated to warn road users. This applies in particular only if the instantaneous vehicle speed is greater than or equal to a predetermined vehicle speed threshold. For example, this threshold is 20 km/h.

Thus, an automatic correction of the steering angle is provided. For this purpose, an interconnection with distance sensors and/or parking sensors, an interconnection with a radar system (for the distance determination), an interconnection with a camera system, an interconnection with an antilock braking system and an interconnection with a lane-keeping assist system are provided in particular.

What is claimed is:

1. A method for operating a vehicle, the method comprising:
    detecting, via a driving environment sensor system, a vehicle environment;
    detecting, via a steering wheel sensor, a steering angle for a vehicle specified by a steering device;
    ascertaining, via a processor, a collision probability for the vehicle based on the detected vehicle environment and the detected steering angle in the case of an unchanged steering angle; and
    correcting, via a control device, the steering angle if the calculated collision probability is greater than or equal to a predetermined collision probability threshold to prevent a collision;
    wherein the steering angle is corrected only within a turning direction, which is left or right, specified by the steering device, and wherein the corrected steering angle is determined by the processor, and
    wherein a hazard warning system of the vehicle is activated to warn other road users in the event of a correction of the steering angle, if a vehicle speed is greater than or equal to a predetermined vehicle speed threshold.

2. The method of claim 1, wherein it is ascertained whether the specified turning direction of the steering device has to be changed even if there is a correction of the steering angle to prevent a collision, and, if so, a warning for changing the turning direction being output.

3. The method of claim 1, wherein an instantaneous target corridor of the vehicle being ascertained based on the detected steering angle, it being ascertained based on the detected vehicle environment whether an object is located in the instantaneous target corridor, and, if so, a warning is output.

4. The method of claim 1, wherein a collision time is ascertained and, in the event of a correction of the steering angle, a prompt to carry out emergency braking being transmitted to the brake system of the vehicle if the ascertained collision time is less than or equal to a predetermined collision time threshold.

5. The method of claim 1, wherein an instantaneous vehicle speed is detected and, in the event of a correction of the steering angle, a lane-keeping assist system of the vehicle being deactivated if the instantaneous vehicle speed is greater than or equal to a predetermined vehicle speed threshold.

6. A device for operating a vehicle, comprising:
    a detection device for detecting a vehicle environment;
    a further detection device for detecting a steering angle for a vehicle wheel specified by a steering device;
    a processing unit for ascertaining a collision probability for the vehicle based on the detected vehicle environment and the detected steering angle in the case of an unchanged steering angle; and
    a control unit for controlling the steering angle to correct the steering angle if the ascertained collision probability is greater than or equal to a predetermined collision probability threshold to prevent a collision;
    wherein the steering angle is corrected only within a turning direction, which is left or right, specified by the steering device, and wherein the corrected steering angle is determined by the processor, and
    wherein a hazard warning system of the vehicle is activated to warn other road users in the event of a correction of the steering angle, if a vehicle speed is greater than or equal to a predetermined vehicle speed threshold.

7. A non-transitory computer readable medium having a computer program, which is executable by a processor, comprising:
    a program code arrangement having program code including program code for operating a vehicle, by performing the following:
        detecting, via a driving environment sensor system, a vehicle environment;
        detecting, via a steering wheel sensor, a steering angle for a vehicle specified by a steering device;
        ascertaining, via the processor, a collision probability for the vehicle based on the detected vehicle environment and the detected steering angle in the case of an unchanged steering angle; and
        correcting, via a control device, the steering angle if the calculated collision probability is greater than or equal to a predetermined collision probability threshold to prevent a collision;
        wherein the steering angle is corrected only within a turning direction, which is left or right, specified by the steering device, and wherein the corrected steering angle is determined by the processor, and
        wherein a hazard warning system of the vehicle is activated to warn other road users in the event of a correction of the steering angle, if a vehicle speed is greater than or equal to a predetermined vehicle speed threshold.

* * * * *